United States Patent
Lee et al.

(10) Patent No.: US 7,615,291 B2
(45) Date of Patent: Nov. 10, 2009

(54) COATING MATERIAL HAVING HEAT AND ABRASION RESISTANCE AND LOW FRICTION CHARACTERISTICS

(75) Inventors: Yong Bok Lee, Seoul (KR); Chang Ho Kim, Seoul (KR); Hosung Kong, Seoul (KR); Hung Gu Han, Seoul (KR); Jeon Kook Lee, Seongnam-si (KR); Jun Hyeon Jo, Daegu (KR); Byoung Su Lee, Gwangmyeong-si (KR)

(73) Assignee: Korea Institute of Science and Technology, Seoul (KR)

( * ) Notice: Subject to any disclaimer, the term of this patent is extended or adjusted under 35 U.S.C. 154(b) by 463 days.

(21) Appl. No.: 11/299,119

(22) Filed: Dec. 8, 2005

(65) Prior Publication Data

US 2007/0003693 A1    Jan. 4, 2007

(30) Foreign Application Priority Data

Jul. 4, 2005    (KR) ..................... 10-2005-0059635

(51) Int. Cl.
*B32B 9/00*    (2006.01)
(52) U.S. Cl. ........................................ 428/701; 428/702
(58) Field of Classification Search ........................ None
See application file for complete search history.

(56) References Cited

U.S. PATENT DOCUMENTS

| | | | |
|---|---|---|---|
| 3,936,295 A | 2/1976 | Cromwell et al. | |
| 5,225,253 A | 7/1993 | Tung et al. | |
| 6,355,356 B1 | 3/2002 | Hasz | |
| 6,723,177 B2 | 4/2004 | Dearnaley et al. | |
| 7,195,828 B2 * | 3/2007 | Gunsel et al. | ............ 428/835.6 |

FOREIGN PATENT DOCUMENTS

| | | |
|---|---|---|
| DE | 694 07 811 T2 | 4/1998 |
| DE | 699 12 386 T2 | 8/2004 |
| EP | 1 013782 B1 | 6/2000 |
| JP | 11 351505 | 12/1999 |
| WO | WO 95/12004 | 5/1995 |

OTHER PUBLICATIONS

Office Action, dated Apr. 27, 2009, issued in German Official File No. 11 2005 003 627.8-45 (w/English translation).

* cited by examiner

*Primary Examiner*—Timothy M Speer
(74) *Attorney, Agent, or Firm*—Jones Day

(57) ABSTRACT

There is provided a coating material having heat and abrasion resistance and low friction characteristics, as well as a method of utilizing the same. The coating material comprises 20 to 40 wt % $Cr_2O_3$, 40 to 60 wt % binder, 10 to 20 wt % $WS_2$, and 10 to 20 wt % Ag. The binder comprises 60 to 80 wt % Ni and 20 to 40 wt % Cr. The binder may further comprise above 0 to 10 wt % Al. The coating method comprises the steps of pulverizing the coating material, pulverizing a binder, applying the pulverized binder to a surface of a workpiece to form a first layer, applying the pulverized coating material to the first layer to form a second layer, and grinding and polishing the surface of the second layer.

3 Claims, 6 Drawing Sheets

COATING MATERIAL HAVING HEAT AND ABRASION RESISTANCE AND LOW FRICTION CHARACTERISTICS

FIELD OF THE INVENTION

The present invention generally relates to a coating material, and more particularly to a coating material having heat and abrasion resistance and low friction characteristics, which can decrease the friction and wear of an element of a certain device operating in a high temperature (700~900° C.) environment. The present invention is further directed to a method of using such a coating material.

BACKGROUND OF THE INVENTION

Generally, air bearings are used to support a rotating shaft of a high-speed rotating device such as an air cycle machine, a gas turbine, a turbocharger or the like. One of such air bearings is an air foil journal bearing that has a bump foil. The supporting ability of the air foil journal bearing can be determined according to the configuration of the bump foil.

Figure 1:
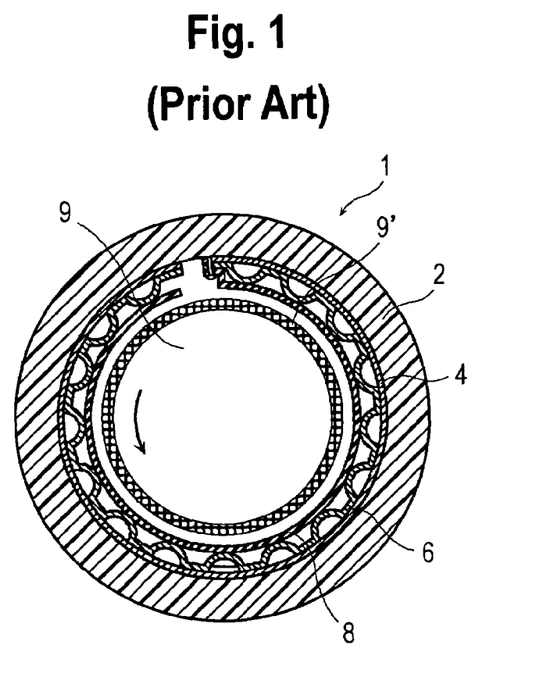
FIG. 1 is a cross-sectional view showing an air foil journal bearing and a rotating shaft of the prior art.

FIG. 1 is a cross-sectional view illustrating an air foil journal bearing and a rotating shaft of the prior art.

As shown in the drawing, an air foil journal bearing 1 comprises: a cylindrical housing 2; a shim foil 4 disposed around the inner periphery of the housing 2; a bump foil 6 mounted on the shim foil 4; and a top foil 8 mounted on the bump foil 6 and supporting a load applied perpendicularly to the axis of a rotating shaft 9. In order to enhance the durability and operational stability at a high temperature, the foils 4, 6 and 8 may be fabricated from an inconel material. In particular, the top foil 8, which contacts the rotating shaft 9 directly, may be coated with a hybrid-solid lubricant or a coating material comprising molybdenum disulfide ($MoS_2$). Also, a coating material 9' comprising chromium carbide ($Cr_3C_2$) may be coated on the rotating shaft 9 to increase anti-abrasion.

However, the above-described coating materials can perform their functions only at a temperature of 500° C. or less. They tend to lose their lubricating ability due to the ignition or thermal deformation at a high temperature of 700~900° C. Thus, there is a long-felt need to develop a coating material having heat and abrasion resistance and low friction characteristics to support a high-speed rotating shaft in a high temperature (700~900° C.) and oil-free environment, as well as the need for a coating method that can increase the durability of the coating material.

SUMMARY OF THE INVENTION

It is an object of the present invention to overcome the problems of the prior art and provide a coating material having heat and abrasion resistance and low friction characteristics, which can be effectively applied to a high-speed moving element of a certain device operating in a high temperature (700~900° C.) and oil-free environment.

It is another object of the present invention to provide a coating method for applying a coating material to a surface of a moving element of a certain device.

Consistent with the foregoing objects and in accordance with one aspect of the present invention as embodied herein, there is provided a coating material comprising 20 to 40 wt % $Cr_2O_3$, 40 to 60 wt % binder, 10 to 20 wt % $WS_2$, and 10 to 20 wt % Ag.

In accordance with another aspect of the present invention, there is provided a coating material comprising 20 to 40 wt % $Cr_2O_3$, 30 to 50 wt % binder, 10 to 20 wt % $WS_2$, 10 to 20 wt % Ag, and 10 to 20 wt % $MoO_3$.

Preferably, the binder comprises 60 to 80 wt % Ni and 20 to 40 wt % Cr. The binder may further comprise above 0 to 10 wt % Al.

A method of coating a surface of an element of a certain device comprises the following steps: pulverizing the coating material; pulverizing a binder; applying the pulverized binder to the surface of the element of the device to form a first layer; applying the pulverized coating material to the first layer to form a second layer; and grinding and polishing the surface of the second layer.

Preferably, the first layer has a thickness of 30 to 50 μm and the second layer has a thickness of 200 to 220 μm.

BRIEF DESCRIPTION OF DRAWINGS

The above object and features of the present invention will become more apparent from the following description of the preferred embodiments given in conjunction with the accompanying drawings.

DETAILED DESCRIPTION OF THE PRESENT INVENTION

Preferred embodiments of the present invention will now be described with reference to the accompanying drawings.

Figure 2:
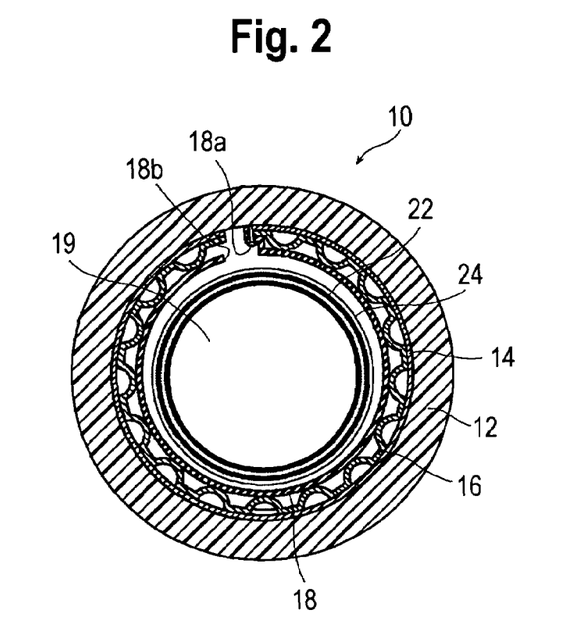
FIG. 2 is a cross-sectional view showing an air foil journal bearing and a rotating shaft coated with a coating material in accordance with the present invention.

FIG. 2 is a cross-sectional view showing an air foil journal bearing and a rotating shaft coated with a coating material in accordance with the present invention.

As shown in the drawing, an air foil journal bearing 10 for surroundingly supporting a rotating shaft 19 comprises a housing 12, a shim foil 14 equipped around the inner periphery of the housing 12, a bump foil 16 mounted on the shim foil 14, and a top foil 18 mounted on the bump foil 16 and supporting a load applied perpendicularly to the axis of a rotating shaft 19. The top foil 18 includes a fixing end 18a fixed to the inner periphery of the housing 12 and a free end 18b extending on the bump foil 16. In order to enhance the durability and operational stability at a high temperature, the foils 14, 16 and 18 may be fabricated from an inconel material, preferably Inconel X-750. Especially, the top foil 18, which contacts the rotating shaft 19 directly, may be coated with a hybrid-solid lubricant having heat and abrasion resistance and low friction characteristics. The solid lubricant forms a thin adhesive layer on the surface of the moving element to reduce friction and wear. As to the solid lubricants used widely in various industries, there are graphite having a layer or lamella structure, molybdenum disulfide ($MoS_2$), tungsten disulfide ($WS_2$), polytetra fluorethylene (PTFE) and the like.

A coating material of the present invention is coated on the rotating shaft 19 so as to reduce the friction generated between the top foil 18 and the rotating shaft 19 while the rotating shaft 19 is rotated. Generally, the friction is maximized when the rotating shaft 19 is started and stopped.

The following table 1 shows components and component ratios of the coating material of the present invention.

TABLE 1

| | Component (wt %) | | | | |
|---|---|---|---|---|---|
| | $Cr_2O_3$ | NiCr | $WS_2$ | Ag | $MoO_3$ |
| CORONA910 | 20~40 | 40~60 | 10~20 | 10~20 | |
| CORONA920 | 20~40 | 30~50 | 10~20 | 10~20 | 10~20 |

The coating material, which is named as CORONA 910 by the applicant, comprises 20~40wt % chromium oxide ($Cr_2O_3$), 40~60wt % nickel chrome (NiCr), 10~20wt % tungsten disulfide ($WS_2$), and 10~20wt % silver (Ag). Also, the other coating material, which is named as CORONA 920 by the applicant, comprises 20~40wt % chromium oxide ($Cr_2O_3$), 30~50wt % nickel chrome (NiCr), 10~20wt % tungsten disulfide ($WS_2$), 10~20wt % silver (Ag), and 10~20wt % molybdenum oxide ($MoO_3$).

Here, $Cr_2O_3$ is one of the oxidized substances having great hardness and has good features of heat and abrasion resistance and low friction so that the same can be primarily used as a coating agent for a moving element of a mechanical device. Also, $Cr_2O_3$ acts on forming an oxide film more stably at a high temperature than tungsten carbide, titanium carbide, titanium nitride and chromium carbide.

Figure 3:
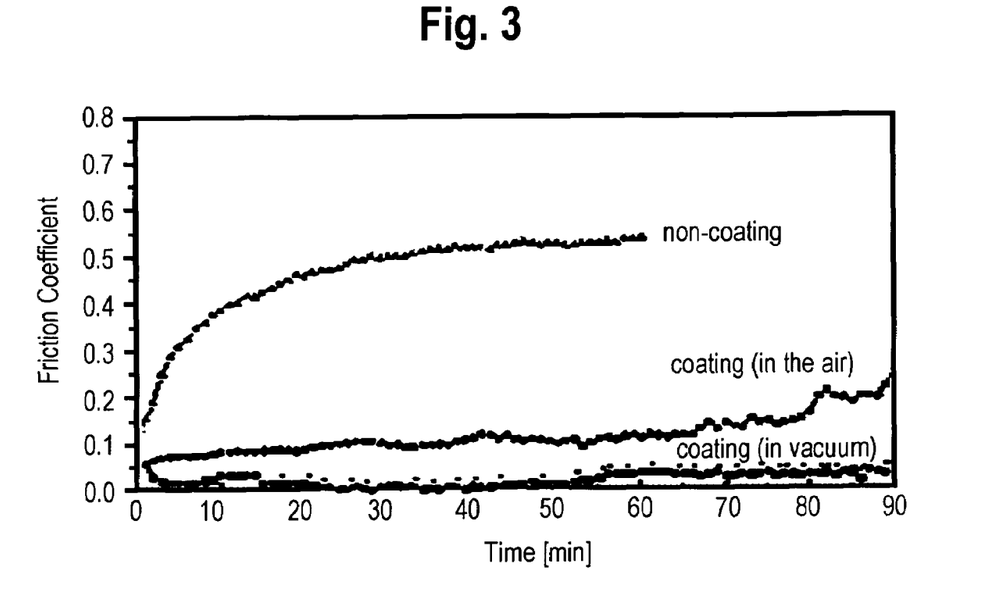
FIG. 3 is a graph showing friction characteristics of tungsten disulfide ($WS_2$) contained in a coating material in accordance with the present invention.

$WS_2$ is a solid lubricant, which can be used from a low temperature of −273° C. to a high temperature of 1,200° C. Especially, when used at a high temperature, $WS_2$ has the better lubricating, antiabrasion, anticorrosion and chemical resistance properties than graphite or $MoS_2$. The friction coefficient of $WS_2$ in the air is about 0.1 or less (see FIG. 3). Also, $WS_2$ can be combined with grease or oil, and can be applied to metal, ceramics, plastic or the like. The temperature range (−273~1,200° C.) for $WS_2$ is broader than the temperature range (350~900° C.) for other solid lubricants such as barium fluoride (BaF) or calcium fluoride (CaF).

$MoO_3$ is a solid lubricant having a strong binding structure. $MoO_3$ reduces a surface tension and contributes to powder crystallization. $MoO_3$ is used at a temperature ranging from 300° C. to 1,000° C., and has a friction coefficient of 0.16~0.25. $MoO_3$ does not achieve a good lubricating performance at a normal temperature (25° C.), but achieves a good performance over 300° C., especially over 700° C.

The coating material of the present invention further comprises Ag, which can endure the high temperature of about 1,000° C. Ag can be used at the temperature ranging from 25° C. to 963° C., and has a friction coefficient of 0.09~0.3.

In addition, the coating material of the present invention further comprises NiCr as a binder for increasing the binding force between the above components. The binder comprises 60~80 wt % Ni and 20~40 wt % Cr. The binder may further comprise above 0 to 10 wt % aluminum (Al). Preferably, the binder in this embodiment comprises 75 wt % Ni, 19 wt % Cr and 6 wt % Al. NiCr has good self-binding features and very strong resisting force against the oxidation and corrosion at a high temperature. The coating material used upon the air foil bearing should have the binding force, which is sufficient enough to endure the pressure of about 30 $MN/m^2$. From this point of view, NiCr is adequate as the coating material since NiCr can endure the pressure of 35 $MN/m^2$ or more.

The following table 2 shows particle sizes of the components of the coating material (CORONA 910, CORONA 920) of the present invention.

TABLE 2

| | Particle Size (μm) | | | | |
|---|---|---|---|---|---|
| | $Cr_2O_3$ | NiCr | $WS_2$ | Ag | $MoO_3$ |
| CORONA910/920 | 5 | 45~120 | 12 | 10~30 | 1.7 |

As shown in the table 2, the particle sizes of all components, i.e., $Cr_2O_3$, NiCr, $WS_2$, Ag, $MoO_3$, are within a range of 1.7~120 μm.

All components provided according to the ratios shown in table 1 and the particle sizes shown in table 2 are mixed evenly and pulverized to powders by, for example, a ball milling process. Then, the powders are dried by, for example, a rotary spray dryer.

Figure 4:
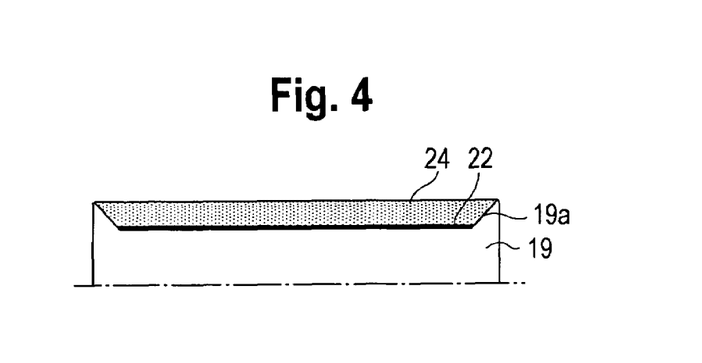
FIG. 4 is a cross-sectional view of a rotating shaft on which a single antiabrasion layer is coated.

FIG. 4 is a cross-sectional view of the rotating shaft 19 on which a single antiabrasion layer is coated.

The rotating shaft 19 may be fabricated from an inconel material, preferably Inconel X-718. As shown in FIG. 4, an undercut portion 19a is formed on the surface of the rotating shaft 19 by a depth of about 250 μm. A NiCr binder layer 22 is coated on the undercut portion 19a by a thickness of about 30~50 μm. Further, an antiabrasion layer 24 of the above coating material (CORONA 910/920) is coated on the NiCr binder layer 22 by a thickness of about 200~220 μm. As described above, the NiCr binder enhances the binding force between the rotating shaft 19 and the antiabrasion layer 24, and has a very strong resisting force against the oxidation and corrosion at a high temperature. The NiCr binder comprises 60~80 wt % Ni and 20~40 wt % Cr. The NiCr binder may further comprise above 0 to 10 wt % Al. Preferably, the NiCr binder comprises 75 wt % Ni, 19 wt % Cr and 6 wt % Al in this embodiment. The particles of the NiCr binder are pulverized to powders and dried by, for example, the ball milling process and the spray drying process.

The powders for forming the NiCr binder layer 22 and the antiabrasion layer 24 are coated on the undercut portion 19a of the rotating shaft 19 by a plasma spray coating process. As is well known, the plasma spray coating process is a technique in which an arc is utilized as the source of heat that ionizes an inert gas such as argon (Ar) and hydrogen (H2) and the powders are injected into the plasma steam discharged from a nozzle, thereby melting the coating material. The molten material is simultaneously propelled and bonded onto the workpiece. The coating process is certainly not limited to the plasma spray coating process.

The following table 3 shows the conditions of the plasma spray coating process.

TABLE 3

| Plasma Spray Coating Process | |
|---|---|
| Electric Current (A) | 450~500(480) |
| Voltage (V) | 40~80(60) |
| Standoff (mm) | 90~110(100) |
| First Reaction Gas | Ar |
| Flow Rate of First Reaction Gas (scfh) | 75~85(80) |
| Second Reaction Gas | H2 |
| Flow Rate of Second Reaction Gas (scfh) | 7~13(10) |
| Feeding Amount of Powder (lbs/hr) | 2.5~3(2.7) |
| Feeding Type of Powder | External |

Here, the numerals in parentheses mean the optimum values. A "standoff" means a distance between an outlet of a nozzle of a plasma spray coating device and the undercut portion 19a of the rotating shaft 19. The powders are fed toward the outlet of the nozzle from the outside. Since the plasma spray coating device and its operation are already well known in the art, the explanation thereof is omitted herein.

After the plasma spray coating process, in order to reduce the friction coefficient, grinding and polishing processes using diamond pastes and abrasive wheels are performed. This is to adjust the surface roughness (preferably, 2 µm) of the antiabrasion layer 24.

Figure 5:
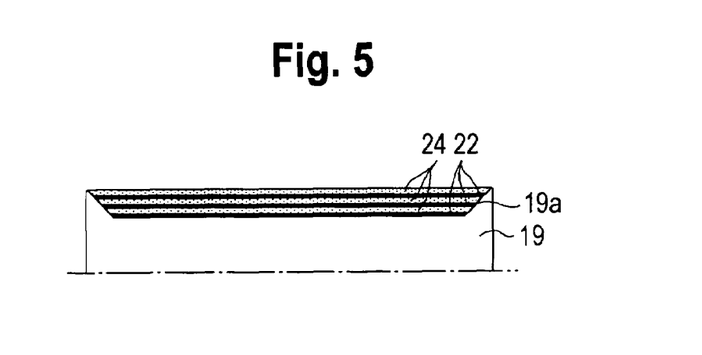
FIG. 5 is a cross-sectional view of a rotating shaft on which multi-antiabrasion layers are coated.

FIG. 5 is a cross-sectional view of the rotating shaft 19 on which multi-antiabrasion layers 24 are coated.

As shown in the drawing, the NiCr binder layer 22 is coated on the undercut portion 19a having a depth of about 250 µm by the plasma spray coating process. Further, the antiabrasion layer 24 (CORONA 910/920) is coated on the NiCr binder layer 22 by the plasma spray coating process. By adjusting the thickness of the NiCr binder layer 22 and the antiabrasion layer 24, the layers 22 and 24 can be provided by two or more, respectively. In this embodiment, the NiCr binder layers 22 and the antiabrasion layers 24 are formed by three, respectively. Each of the thickness of the layers 22 and 24 are within the range of 30~50 µm, but are certainly not limited thereto. Such a multi-antiabrasion layer structure has the stronger binding force and the better durability and low friction features than the above single antiabrasion layer structure (see FIG. 4). For example, the single layer structure can endure the pressure of about 35 MN/m². However, the three-layer structure can endure the pressure of about 105 MN/m².

In consideration that the wear of the antiabrasion layer 24 after 30,000 cycles of the rotating shaft is generally limited to 25 µm, which is 10% of the entire thickness, 250 µm, of the layers 22 and 24 in the art, it is preferable to coat the antiabrasion layer 24 by a thickness of 30 µm or more.

Figure 6:
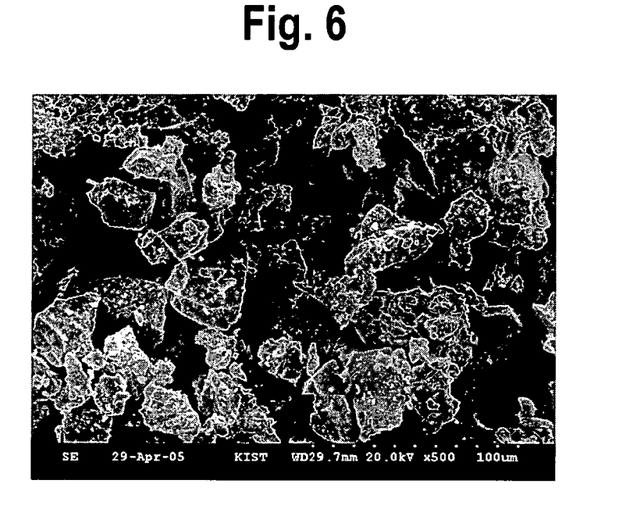
FIG. 6 is a picture of a coating material inspected by an electron microscope.

Referring now to FIG. 6, the powder of the final coating layer (CORONA 910) is maintained in a size of about 40~50 µm.

Figure 7:
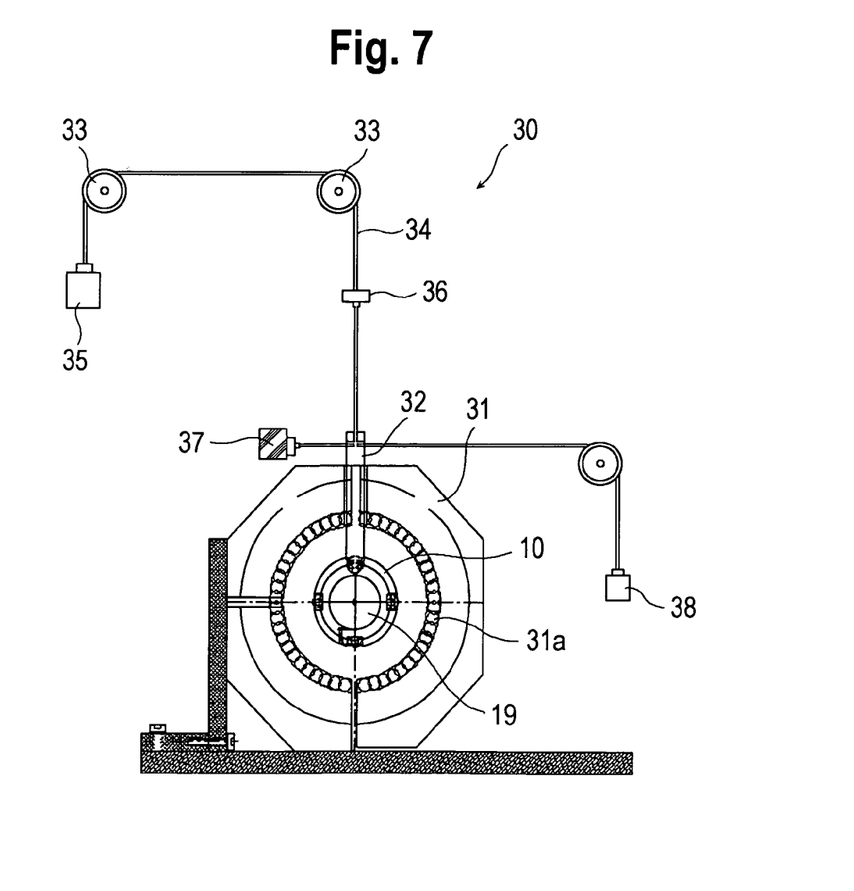
FIG. 7 is a schematic view showing a device for testing a performance of a coating material in accordance with the present invention.

FIG. 7 is a schematic view showing a device for testing the friction coefficient of the rotating shaft to which the coating material of the present invention is applied.

As shown in the drawing, a testing device 30 comprises a main body 31 containing the rotating shaft 19 and the air foil bearing 10, means for applying a load to the housing 12 (see FIG. 2) of the air foil bearing 10, and a torque sensor 37 for detecting the torque generated during the rotation of the rotating shaft 19.

The main body 31 includes heating means 31a, which can radiate the heat to 1,200° C., and driving means (not shown), e.g., BLDC motor, for rotating the shaft 19 to 66,000 rpm.

The load applying means includes a load bar 32, a rope 34 and a weight 35. One end of the load bar 32 is coupled to a radial top point of the housing 12 of the air foil bearing 10, while the other end is extended vertically outside the main body 31. The rope 34 is connected to the other end of the load bar 32 and suspended on at least one pulley 33. The weight 35 is connected to the front end of the rope 34 to apply a load (e.g., 10 kPa) to the load bar 32 for pulling the same upward. A load sensor 36 is mounted to the rope 34 to detect the load applied to the housing 12 of the bearing 10. The reference numeral 38 indicates a balance weight for applying a load horizontally to the load bar 32 so as to maintain the load bar 32 upright.

Figure 8:
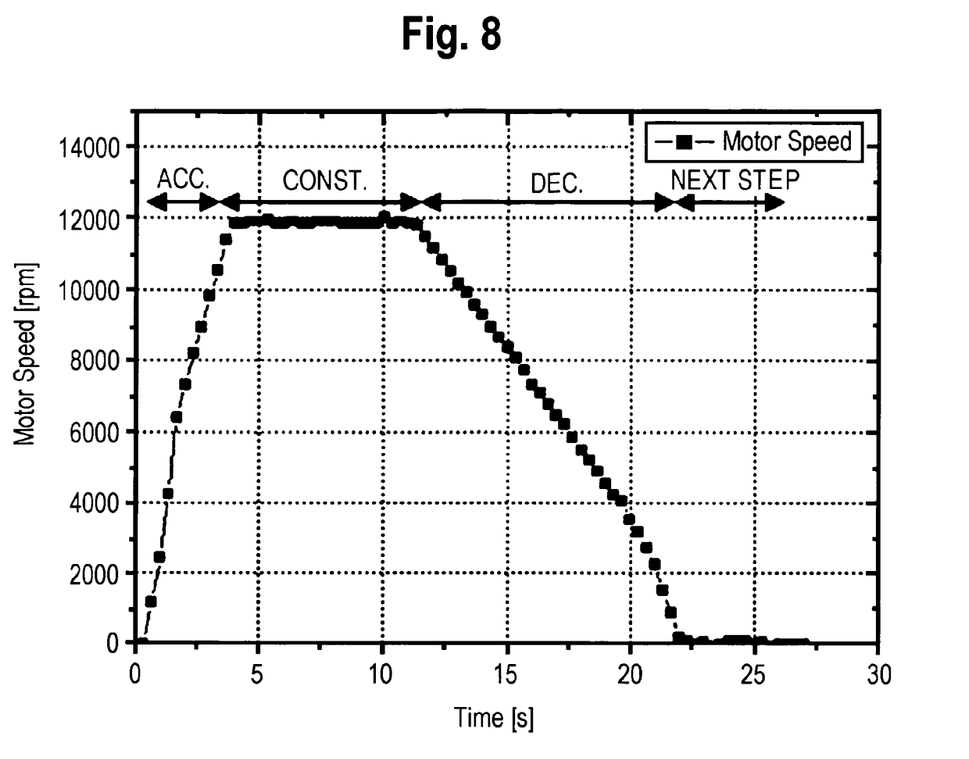
FIG. 8 is a graph showing a motor speed of a rotating shaft during one cycle of a testing device of FIG. 7.

Before operating the testing device, the housing 12 of the air foil bearing 10 is maintained to being pulled upward due to the weight 35 connected to the rope 34. This is so that the radial bottom point of the rotating shaft 19 is placed in contact with the top foil 18 (see FIG. 2) of the bearing 10. When the rotating shaft 19 is rotated, the ambient air is introduced into the space between the rotating shaft 19 and the bearing 10. The rotating shaft 19 rises from the top foil 18 of the bearing 10. After a while, when stopping the rotating shaft 19, the radial bottom point of the rotating shaft 19 becomes in contact with the top foil 18 of the bearing 10. The test has been performed under the condition that the rotating shaft 19 is coated with the CORONA 910 and the temperature is 25° C. and 700° C. As shown in FIG. 8, a cycle including an acceleration mode (ACC), a constant mode (CONST), a deceleration mode (DEC) and a ready mode (NEXT STEP) is performed for 26 seconds. The motor speed during the constant mode is about 12,000 rpm.

Figure 9:
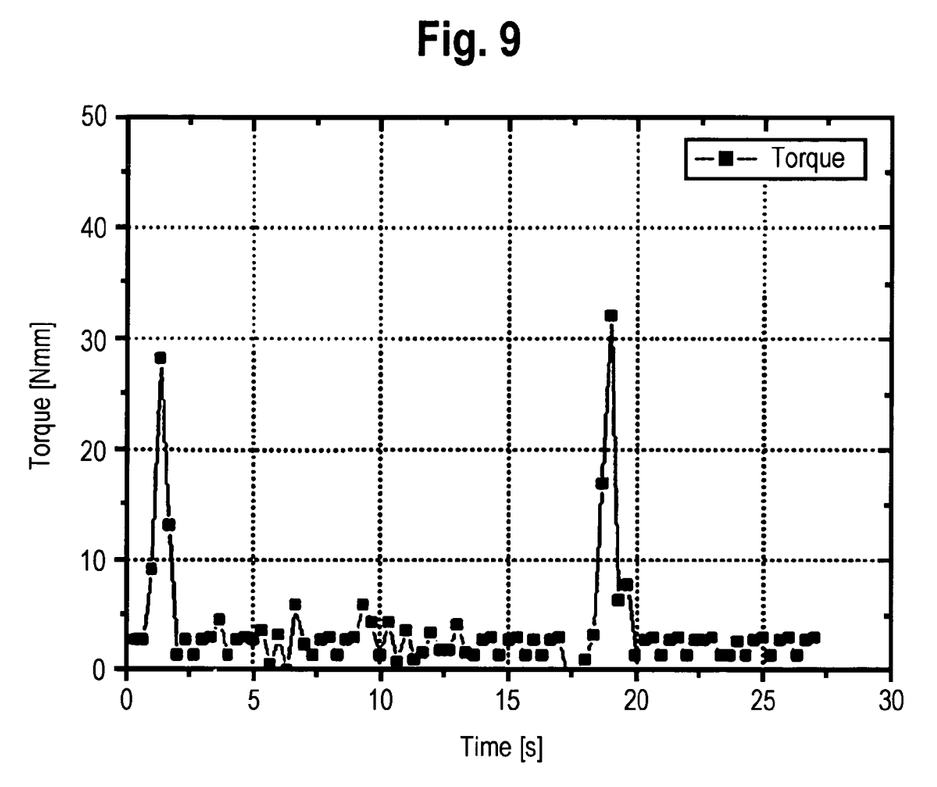
FIG. 9 is a graph showing a torque of a rotating shaft during one cycle of a testing device of FIG. 7.

FIG. 9 is a graph showing a torque of the rotating shaft 19 during one cycle of the testing device. The torque at starting the rotating shaft 19 is about 28 Nmm, and the torque at stopping the rotating shaft 19 is about 32 Nmm. As such, the torques at starting and stopping the rotating shaft 19 are very important because the rotating shaft 19 hardly contacts the foil of the bearing once the rotating shaft 19 rises from the foil. Accordingly, the durability and performance of the air foil bearing are mainly influenced by the friction between the rotating shaft 19 and the foil of the bearing when starting and stopping the rotating shaft 19.

Figure 10:
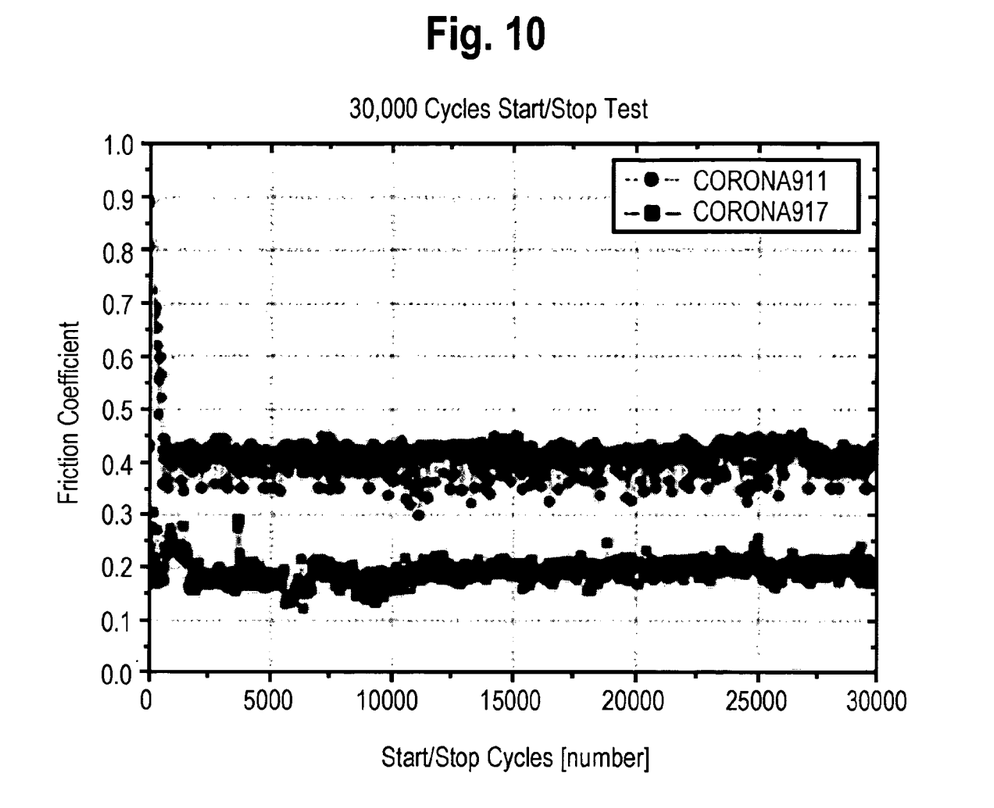
FIG. 10 is a graph showing a friction coefficient calculated during 30,000 cycles of a testing device of FIG. 7 in a normal temperature (25° C.) and high temperature (700° C.) environment.

FIG. 10 shows a friction coefficient µ when starting and stopping the rotating shaft 19 coated with the CORONA 910 during 30,000 cycles of the testing device. The friction coefficient µ is calculated from the load N detected by the load sensor 36 and the torque T detected by the torque sensor 37 (µ=T/N). In FIG. 10, "CORONA 911" means that the test is performed at a temperature of 25° C., while "CORONA 917" means that the test is performed at a temperature of 700° C. The mean value of the friction coefficient of the CORONA 911 is about 0.407, while the mean value of the friction coefficient of the CORONA 917 is about 0.192. As known from these test results, the coating material of the present invention has a better effect at a high temperature environment rather than at a normal temperature environment. Furthermore, because most of the real high speed rotating devices is supposed to start after being preheated to a predetermined temperature, the coating material of the present invention is more practical.

The following table 4 shows the wear of the air foil bearing and the rotating shaft coated with the CORONA 910 after 30,000 cycles of the testing device 30 under the above-described test conditions.

TABLE 4

| Shaft | Foil | Temp. | Friction, μ | Test Cycles | Foil Wear | Shaft Wear | Limited Life |
|---|---|---|---|---|---|---|---|
| CORONA 910 | Bare | 25° C. (Corona 911) | 0.407 ± 0.02 | 30,000 | 10 μm ± 2 | 10 μm ± 2 | 75,000 |
| | | 700° C. (Corona 917) | 0.192 ± 0.02 | 30,000 | 5 μm ± 2 | 5 μm ± 2 | 150,000 |

As shown in table 4, the rotating shaft 19 and the top foil 18 of the bearing 10 wear by 10 μm±2 at a temperature of 25° C. (CORONA 911), respectively, by which the limited life of the rotating shaft 19 and the bearing 10 can be estimated to be 75,000 cycles. Also, the rotating shaft 19 and the top foil 18 of the bearing 10 wear by 5 μm±2 at a temperature of 700° C. (CORONA 917), respectively, by which the limited life of the rotating shaft 19 and the bearing 10 can be estimated to be 150,000 cycles.

The above-described coating material in accordance with the present invention can be applied to elements of all kinds of devices, which have a contact movement (rotating, sliding and the like).

As described above, the coating material and coating method according to the present invention enhance the durability and operational stability of a mechanical device such as a gas turbine, a steam turbine or a turbo charger (e.g., reducing a "turbo-lag" phenomenon of a turbo charger) due to its own low friction and high antiabrasion features and the usability in environments of high temperature as well as those of normal temperature. Further, when the present invention is applied to an air foil bearing, the load supporting ability and the damping ability of the air foil bearing can be considerably enhanced.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes, which come within the equivalent meaning and range of the claims, are to be embraced within their scope.

What is claimed is:

1. A coating material applied to a surface of an element of a device, comprising:
    20 to 40 wt % $Cr_2O_3$, 40 to 60 wt % binder, 10 to 20 wt % $WS_2$, and 10 to 20 wt % Ag, wherein the binder comprises 60 to 80 wt % Ni and 20 to 40 wt % Cr.

2. A coating material applied to a surface of an element of a device, comprising:
    20 to 40 wt % $Cr_2O_3$, 30 to 50 wt % binder, 10 to 20 wt % $WS_2$, 10 to 20 wt % Ag, and 10 to 20 wt % $MoO_3$, wherein the binder comprises 60 to 80 wt % Ni and 20 to 40 wt % Cr.

3. The coating material of claim 1 or 2, wherein the binder further comprises above 0 to 10 wt % Al.

* * * * *

UNITED STATES PATENT AND TRADEMARK OFFICE
CERTIFICATE OF CORRECTION

PATENT NO. : 7,615,291 B2  
APPLICATION NO. : 11/299119  
DATED : November 10, 2009  
INVENTOR(S) : Lee et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 800 days.

Signed and Sealed this

Fourteenth Day of December, 2010

David J. Kappos  
*Director of the United States Patent and Trademark Office*